United States Patent
Spencer

[11] Patent Number: 6,095,714
[45] Date of Patent: Aug. 1, 2000

[54] LATCH LOCK JOINT FOR TELESCOPING TUBES

[75] Inventor: Duane R. Spencer, Lakehead, Calif.

[73] Assignee: TRW Inc., Redondo Beach, Calif.

[21] Appl. No.: 09/054,935

[22] Filed: Apr. 3, 1998

[51] Int. Cl.$^7$ .................................... B25G 3/00
[52] U.S. Cl. ........................ 403/377; 285/319; 285/307
[58] Field of Search ................. 403/12, 289, 290, 403/328, 329, 376, 377; 285/23, 302, 307, 319, 322; 343/901; 175/321

[56] References Cited

U.S. PATENT DOCUMENTS

| | | |
|---|---|---|
| 364,823 | 6/1887 | Ingold . |
| 757,929 | 4/1904 | Huhsman ........................ 285/322 X |
| 1,301,565 | 4/1919 | Jacobs . |
| 2,719,363 | 10/1955 | Montgomery et al. ............ 175/321 X |
| 2,784,987 | 3/1957 | Corcoran . |
| 2,941,822 | 6/1960 | Moecker . |
| 3,199,902 | 8/1965 | Fierstine ............................ 403/12 |
| 3,647,007 | 3/1972 | Norton ............................ 175/321 X |
| 3,933,378 | 1/1976 | Sandford et al. ................... 285/319 |
| 4,028,709 | 6/1977 | Berkowitz et al. . |
| 4,041,498 | 8/1977 | Freimark et al. . |
| 4,067,534 | 1/1978 | Frey . |
| 4,135,745 | 1/1979 | Dehar . |
| 4,209,080 | 6/1980 | Douglas ........................... 285/319 X |
| 4,313,627 | 2/1982 | De Lange ......................... 285/302 X |
| 4,325,069 | 4/1982 | Hills . |
| 4,353,075 | 10/1982 | Edwards . |
| 4,568,808 | 2/1986 | Thuries et al. . |
| 4,603,333 | 7/1986 | Carlson . |
| 4,920,354 | 4/1990 | Rauser et al. . |
| 4,979,765 | 12/1990 | Bartholomew ................... 285/319 X |
| 5,039,139 | 8/1991 | McElroy et al. . |
| 5,503,224 | 4/1996 | Field ............................... 175/321 X |
| 5,882,049 | 3/1999 | Beans ............................... 285/321 |

*Primary Examiner*—Lynne H. Browne
*Assistant Examiner*—Greg Binda
*Attorney, Agent, or Firm*—Michael S. Yatsko; Ronald M. Goldman

[57] ABSTRACT

A latching joint for telescoping tubes incorporates two telescoping cylindrical members, referred to as rings, one (3) being positioned at least partially within the other (1). The inner ring carries a peripheral skirt of radially outwardly biased spring fingers (5) which, prior to tube extension, are restrained from outward expansion by a coaxially mounted O-ring (7). When the inner ring is pushed or pulled out from the outer ring to the extended position the O-ring is forced off the spring fingers, allowing the fingers to expand and latch the two rings in the extended position. With the arm extended the O-ring then serves as a gasket providing an axial force that is transmitted through the inner tube to the spring fingers to hold the spring fingers firmly latched.

13 Claims, 2 Drawing Sheets

LATCH LOCK JOINT FOR TELESCOPING TUBES

FIELD OF THE INVENTION

This invention relates to telescoping tube type extensible support arms that extend, position and support antennas and/or solar arrays from space vehicles and, more particularly, to a novel latching lock joint structure for locking adjacent tube sections in extended position.

BACKGROUND

Satellites and other Space vehicles customarily serve as a platform for electronic communication and detection equipment in outer space. Through antennas associated with that equipment a communications link is established to transmit and/or receive radio signals to remote locations, including locations on the Earth. Solar arrays are also conventionally deployed aboard space craft to convert the sun's radiant energy into electrical power used to charge the on-board DC batteries that furnish electrical power to that communication equipment.

The solar arrays and antenna reflectors and feed assemblies are referred to as "deployables". That is, for lift off into space, they are physically condensed or folded into the smallest possible package to better use the limited space available on the space craft. However, once the space craft attains orbit, the communications antennas and solar arrays are unfolded and held in position alongside the exterior of the satellite to serve their respective communication and power functions. To do so the antenna reflector and feed and the solar arrays are often supported or held by a support arm or bracket, sometimes referred to as a boom. The support arm is also designed to occupy minimum storage space for lift off and transition into orbit and thereafter extend to the arm's full reach.

One such support arm is a telescoping tube structure, variations of which may be known to the lay reader. Such a tube arrangement is conventionally found in the automobile antenna and in the shaft of collapsible umbrellas, a structure likely familiar to most readers. In that structure a number of cylindrical tubes of consecutively smaller diameter are stacked or "nested" concentrically inside one another. The tube structure may be extended to its full length by arranging the tubes along a common axis. Adjacent tubes in the assembly are linked at a joint, whereby pulling out the end tube engages the next tube at the joint which, with continued pulling, is also withdrawn and axially extended. That process continues until all of the tubes that were confined in the largest cylinder have been withdrawn.

By extending the smallest diameter tube to full length, the end of that tube links to the top end of the next tube in the order, and, with continued pulling that next tube is also axially withdrawn from the larger tube until its end links to the front end of the third tube in the order. And with continued pulling on the first tube, the third tube is also withdrawn. This action continues, with the rear end of the withdrawn tube engaging and forming a joint with the top end of the next tube in the bundle, until all the tubes are withdrawn and arrayed end to end to form a single long tube. That long tube is stabilized by the formed joints. It is appreciated that the order of tube extension may be reversed, ie. The largest diameter tube deploying first; or may be random. At full extension, all joints engage and stabilize the structure.

At first impression, such a telescoping tube arrangement appears to offer an attractive solution for deploying spacecraft antenna components and solar arrays in outer space. With automobile antennas and umbrella shafts, however, the frictional contact inherent in the tube to tube link aids in maintaining the tubes in the linearly extended relationship. For spacecraft application, that high friction relationship is unacceptable. In a telescoping tube for spacecraft application, the friction or, as variously termed, "drag", between the tubes when the tubes are extending, should be very low. And, when finally latched at the end of travel, the tubes should be positively and accurately located and provide a very stiff joint so the support arm formed thereby does not unduly vibrate, wobble or sway. Such features are unavailable with the telescoping tubes employed in automobile antennas or collapsible antennas.

The diameter of the tubes forming a telescoping boom affects the bending and torsional stiffness of that boom. The smaller diameter, the better. When several tubes are telescoped, one into the other, the tube diameters of each successive tube must be such as to allow the successive tube to fit inside the adjacent tube, and to clear the joint. Constructions using thick-walled tubes necessarily result in larger diameter tubes, than telescoping thin-walled tubes. By minimizing the thickness of the tubes to the greatest possible extent, the diameter of the nested tubes can be minimized and the most advantageous stiffness characteristic achieved.

Accordingly an object of the present invention is to provide a new mechanical latching joint for connecting tubes in a telescoping tube structure.

Another object of the invention is to provide a telescoping tube arrangement in which the tubes may be extended with minimal force and, once extended, exhibit such joint stiffness as required to accurately position the end of the tube assembly, and stabilize the segments.

And an ancillary object of the invention is to minimize the thickness of the joint wall in a telescoping tube structure, thereby requiring minimum "stepping down" in adjacent tubes.

SUMMARY

In accordance with the foregoing objects, the present invention is of a latching joint structure, which may be considered apart from the lengths of tubing that are attached to the joint to complete a telescoping tube arrangement. A latching joint for telescoping tubes incorporates two telescoping cylindrical members, referred to herein as rings, one being positioned at least partially within the other. The inner ring carries a peripheral skirt of radially outwardly biased spring fingers which, prior to tube extension, are restrained from outward expansion by a coaxially mounted O-ring. When the inner ring is pushed or pulled out from the outer ring to the extended position the O-ring is forced off the spring fingers, allowing the fingers to expand and latch the two rings in the extended position.

The O-ring also then serves as a non-compressible gasket between a flange on the end of the inner tube and a lip on the outer tube and is maintained pressed there between by an axial force exerted by the spring fingers or, as alternatively viewed, produces a restoring axial force that is transmitted through the flange and the inner tube to the spring fingers to hold the spring fingers latched.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

DETAILED DESCRIPTION OF THE PREFERRED EMBODIMENTS

Figure 1:
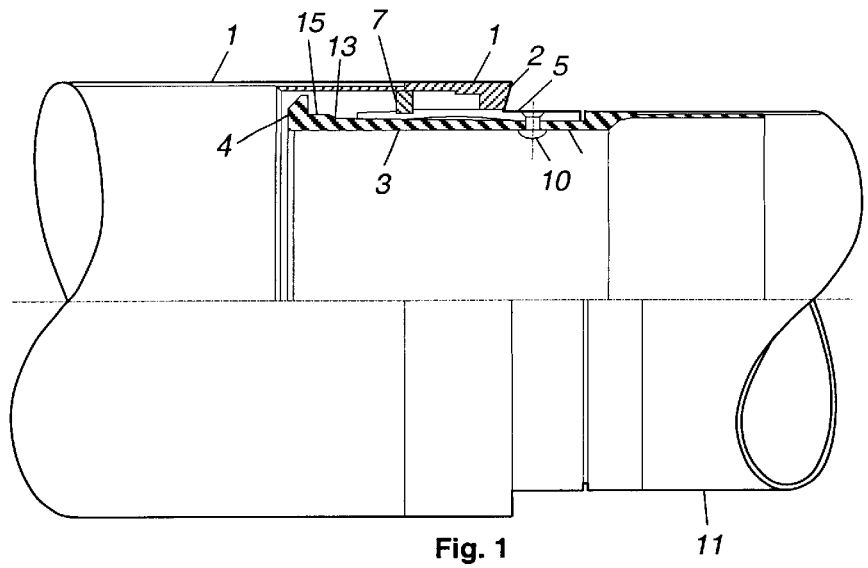
FIG. 1 is a partial section view of the invention as contained in a tube assembly in the standby position.

Reference is made to FIG. 1, which shows the novel joint in partial section view as assembled to telescoping tubes with the joint elements positioned partially extended. The joint includes a pair of tube members or, as variously termed, rings 1 and 3 of a generally hollow cylindrical shape, suitably constructed of a metal such as Titanium, a plurality of straight spring metal fingers 5, only one of which is visible in this view, and an O-ring 7. Inner ring 3 is smaller in diameter than the outer ring and fits concentrically within outer ring 1 in a telescopic relationship. Tubes 1 and 3 are free to move axially a limited extent relative to one another as is required for a telescoping structure.

The outer ring 1 includes a shaped lip 2 at the front end. The lip extends about the periphery of the ring radially inward, thereby reducing the size or diameter of the front opening into the hollow of the ring. As illustrated, the outer diameter of lip 2 is the same as that of an outer wall of the ring, and the lip's smaller inner diameter is slightly larger than the outer wall diameter of the inner ring 3, permitting the front end of the inner ring to protrude through the front opening in the outer ring, and also allowing spring fingers 5 that are carried on the inner ring to extend into the interior of outer ring 1.

The inner ring 3 contains a rim or flange 4 at the rear end, shown to the left in the figure. The flange extends about the periphery of and radially outwardly from the outer surface of inner ring 3. Flange 4 is of an outer diameter that is slightly less than the diameter of the inner surface of outer ring 1 so as to allow sufficient clearance with the outer ring. The clearance permits the rear end of the inner ring to be moved axially into and along the axis of outer tube 1. Although inner ring 3 may be slidable through the outer ring, the extent of that movement is limited at the extreme end of travel. The lip 2 at the front end of the outer ring acts as a barrier or stop to O-ring 7 and flange 4.

In forming the telescoping tube device, the joint is attached to a pair of adjacent elongate tubes of a telescoping tube structure, only partially illustrated in the figure, with the larger outer ring 1 being attached to the larger diameter tube 9 and the inner ring 3 being attached to the smaller diameter tube 11. Tubes 9 and 11 are typically formed of a graphite composite material and are attached to the respective Titanium metal joint sections with a conventional epoxy, but may be of any construction and attachment to the fittings.

Figure 2:
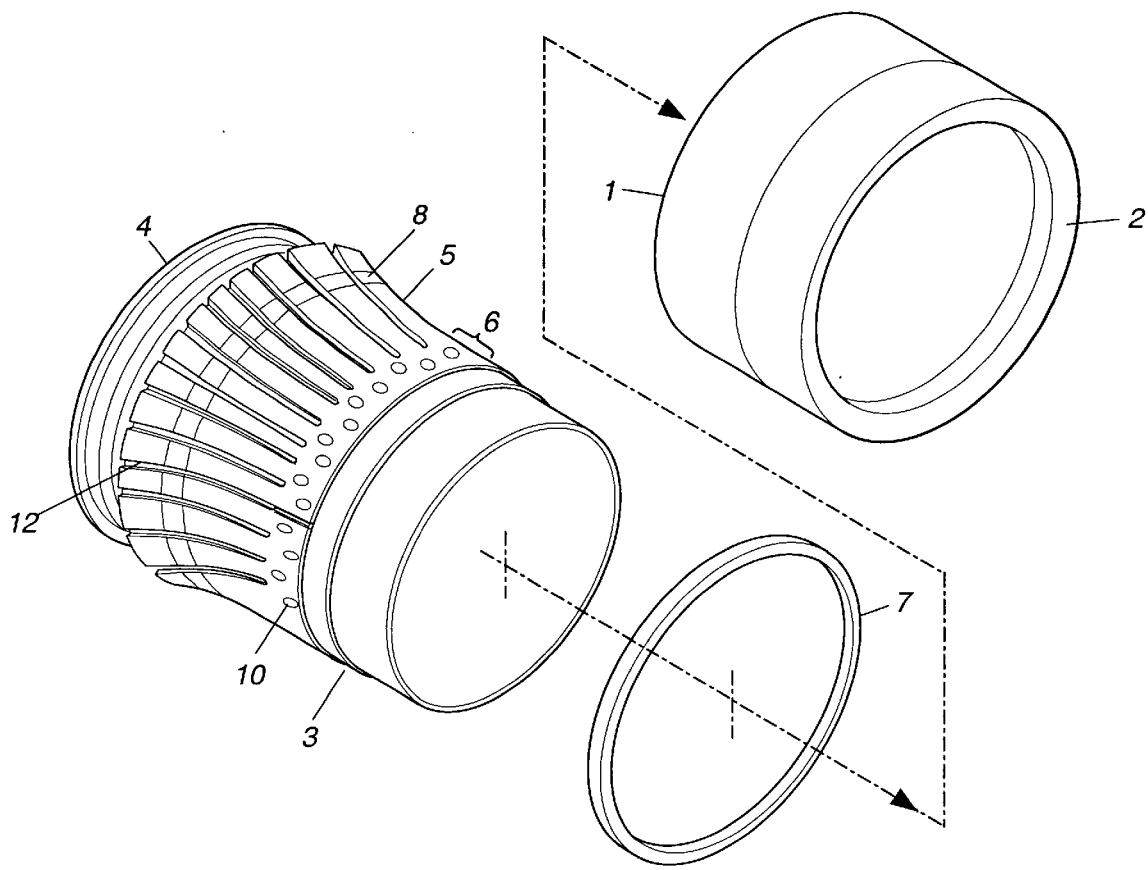
FIG. 2 is an exploded view of the embodiment of FIG. 1.

Due to its construction, which is illustrated in FIG. 2, later described in greater detail, spring fingers 5 are mechanically biased to flare outward at its distal or free end under a stored spring force that results from pressing the spring finger against the inner ring 3. Manually inserted over those spring fingers in the position illustrated, O-ring 7 serves to press and hold the spring fingers 5 down against the outer surface of the inner ring 3, restraining the springs from flaring outward, when the joint is in the standby or unextended position illustrated in FIG. 1.

The O-ring is formed of a space qualified material. The O-ring's outer diameter is slightly less than the inner diameter of the cylindrical interior wall of outer ring 1, essentially taking up any slack in the radial direction, yet minimizing drag should one joint ring be moved axially relative to the other. Its inner diameter is greater than the radius defined by the combined diameter of the inner ring's outer wall or surface at that location and double the thickness of the spring fingers, recognizing that another spring finger, not illustrated, is positioned diametrically opposite to the illustrated spring finger on the ring. It may be of any appropriate thickness. To further minimize friction or drag, the O-ring is preferably lubricated with a space qualified grease, such as Molybdenum disulfide. The ring possesses sufficient strength to withstand any significant expansion or strain resulting from the radially outward force exerted on it by spring fingers 5.

Spring fingers 5 and the other elements are better illustrated in exploded view in FIG. 2 to which reference is made. The spring fingers are formed along a narrow web or collar portion 6 and extend in the axial direction toward flange 4, resembling a skirt about the collar portion. Unrestrained by the O-ring, the spring fingers flare radially outward a short distance, the distal ends thereby defining a larger diameter circle, than before, when the diameter is essentially the inner diameter of the O-ring. The diameter of the circle defined by the distal end of the spring fingers is as great or greater in diameter than the inner diameter of outer ring 1 and lip 2, but less than the outer diameter of outer ring 1 and lip 2.

The spring finger sub-assembly is constructed from a flat rectangular sheet of spring metal, such as a Beryllium Copper alloy, a strong stiff metal. A number of identical elongate parallel slots are cut from one of the longer sides of the rectangular sheet, up to a short distance from the other rectangular edge, leaving the collar portion described and defining the fingers between adjacent slots. Preferably, at a short distance from the distal ends of the fingers, a shallow band or indentation 8 is machined in the finger's outer surface. That indentation conveniently serves as a temporary seat for the O-ring. Further, a plurality of rivet holes are also drilled about the collar in the axially staggered relationship shown.

With the slots completed, the sub-assembly is heat treated and mechanically worked, bending the fingers beyond the yield point of the spring material to provide a permanent outwardly directed flare of predetermined diameter, thereby giving the fingers the necessary cantilevered spring characteristic required for the joint. The sub-assembly is again heat treated and mechanically worked into a permanent cylindrical shape to form the collar or sleeve with the skirt of spring fingers. In the cylindrical shape, the two narrow ends of the rectangular sheet are facing each other and define a longitudinally extending seam 12 to the collar portion as shown in FIG. 2.

The spring fingers are formed so that they contain a slight concave bow. When one end of the finger is held fixed in position, the other free end of the finger may be pressed down against the distal end, moving the distal end to create a reactive spring force. The degree of that force is dependent on the distance the end moves, in accordance with the equation governing straight linear springs, essentially y=kx, where k is the spring constant, x the distance the end is moved, and y the resultant force, stored in the spring, biasing the spring against the pressing finger.

To mount the spring finger assembly onto ring 3, one manually spreads or forces seam 12 apart slightly to enlarge the sleeve's effective diameter temporarily, slides the assembly in place on inner ring 3, and then releases the ends of the subassembly, whereby the elastic material springs back to its cylindrical shape, re-closing the seam. With the rivet holes as guides, a series of rivet passages is then drilled through the wall of the inner ring. The subassembly is then permanently fastened to ring 3 with rivets 10, thereby anchoring a proximal end of each spring finger at a fixed location on the inner ring and completing the portion of the joint.

O-ring 7 is then slid axially onto and along the tube 3 and into a position overlying the spring fingers, forcing the distal end of the fingers against the outer surface of ring 3. The O-ring seats in the annular indentation 8 in the fingers. Due to the spring characteristic of the finger material, the fingers exert a radially outward spring force against the inner surface of the O-ring, but the O-ring restrains outward expansion of the fingers at this stage.

The joint portion is then inserted within outer ring 1, the remaining joint portion, through the rear end, the left side in the figure, exposing a portion of the inner ring and supported spring fingers through the front end of the outer ring. That completes assembly of the telescoping joint. The telescope tubes 9 and 11 may then be bonded with an epoxy resin to the respective joint sections as illustrated in FIG. 1 to which reference is again made.

By pushing or pulling tube 11 and attached ring 3 to the right, while tube 9 remains stationary, spring fingers 5 and O-ring 7 are carried to the right. As tube 11 and ring 3 are jointly moved a predetermined distance to the right, the O-ring abuts against the left side of annular lip 2 on ring 1, which stops further rightward axial movement of the O-ring. As tube 11 and ring 3 continue to be withdrawn further from the interior of outer ring 1, lip 2 holds the O-ring, while the spring fingers 5 continue being carried to the right. As a consequence, the O-ring is forced off its seat 8 on the fingers, and, ultimately, entirely off the fingers as ring 3 continues its axially directed movement to the right.

Figure 3:
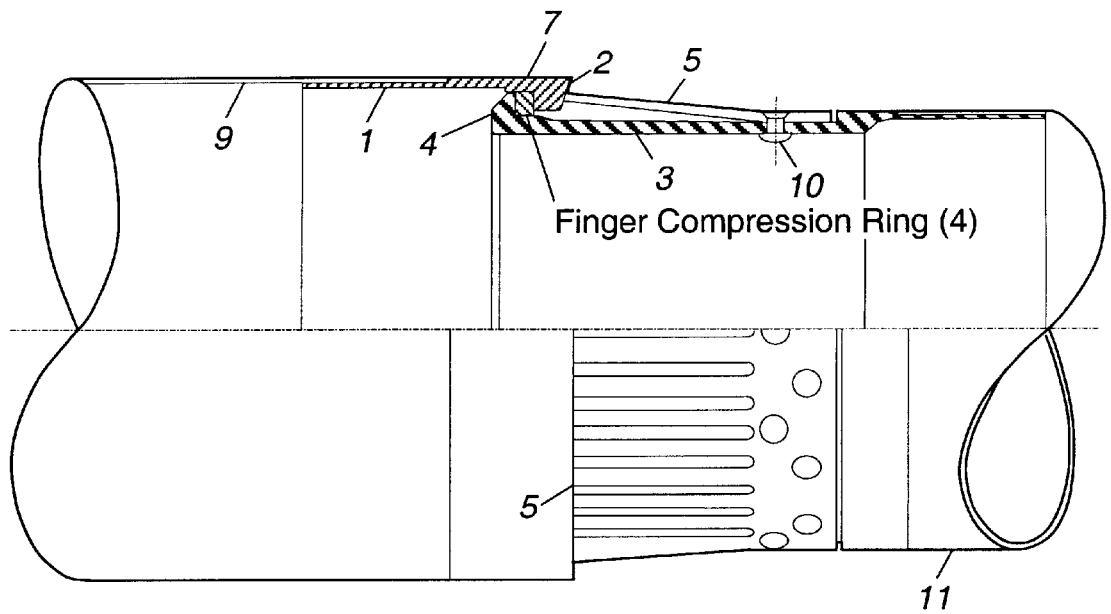
FIG. 3 is a partial section view of the embodiment of FIG. 1 with the tubes in extended position.

Freed of the restraint imposed by the O-ring, the spring fingers then outwardly expand against the inner edge of the circular lip 2, which temporarily prevents further outward expansion of the fingers. And with further withdrawal of tube 11 the fingers are freed of the restraint produced by the inner circular lip edge and radially outwardly expand further to abut the inwardly conically tapered front edge of the lip 2. This position is illustrated in the section view of FIG. 3. By abutting the front tapered surface of lip 2, the spring fingers prevent inner ring 3 from being axially moved to the left, that is, back into the interior of the outer ring 1. The joint is thereby latched or locked with its ring elements in extended relationship. Concurrently, in this embodiment O-ring 7 is pressed between flange 4 and lip 2 to force the end of the spring fingers against lip 2, as hereinafter described in greater detail.

Figure 4:
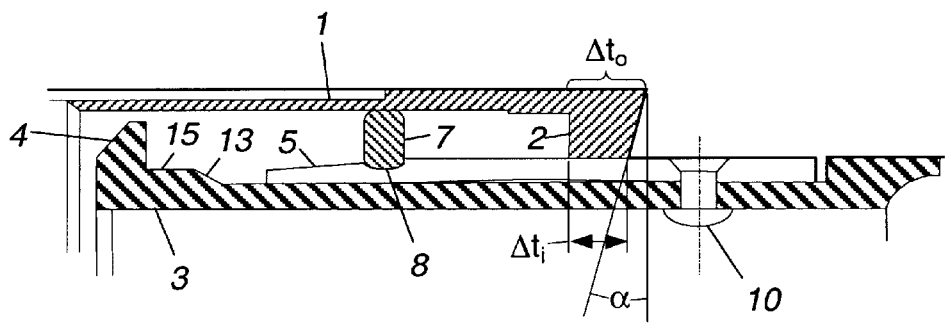
FIG. 4 is a partial section view of the embodiment of FIG. 1 to enlarged scale to better illustrate additional features of the invention.

Brief reference is made to the enlarged partial section view of FIG. 4 which better illustrates important elements in enlarged scale. To the left in the figure, a portion 15 of the outer surface of ring 3, located next to flange 4, is larger in diameter than the principal surface, including that portion located beneath spring fingers 5. And next to that large diameter plateau, a further portion 13 of the ring's outer surface is conically tapered upward to the left. This serves as a ramp for guiding O-ring 7 onto plateau 15. The diameter of plateau is equal to or slightly larger than the inner diameter of O-ring 7.

As shown to the right in FIG. 4, lip 2 is regressively inwardly sloped or tapered at an angle, $\alpha$, referred to herein as concavely tapered. Its front surface forms a section of a shallow right cone whose apex is located on the bodies axis and to the left of the tube's front end. Accordingly, the thickness of the lip, the distance between the lip's front edge and the back edge within the ring's interior, is greatest at the radially outward edge, shown as $\Delta_{to}$, and less at the radially inward edge, where the thickness is shown as $\Delta_{ti}$. The distal end of spring fingers 5 are designed to press against that concavely tapered front edge lip surface for reasons hereinafter described. Note that the distal end of spring finger 5 is axially spaced from flange 4. As becomes clear from the description which follows, that spacing is equal to or slightly greater than the thickness of O-ring 7 and the untapered portion of lip 2's thickness, $\Delta_{ti}$.

Returning to FIG. 3, with tube 11 and joint ring 3 fully withdrawn to extended position and latched, the relationship of the joint elements is illustrated in partial section view. As illustrated, the rear flange 4 of inner ring 3 serves as a stop to limit the extent of axial movement of the inner ring and its associated tube section 11, relative to outer ring 1. The O-ring is forced up a ramp surface 13 formed on the outer surface of ring 3, thereby expanding or stretching the O-ring slightly. The ramp surface 13 is formed as a section of a shallow right cone, thereby linearly increasing the diameter of the tube's outer wall as a function of the axial distance measured from the starting point and continuing to the left in the figure to the ending point where the outer surface attains a plateau 15 at a new larger diameter. By expanding the O-ring, the O-ring takes up any clearance between the two rings, thereby preventing the two sections from wobbling. Plateau 15 is seen as an enlarged diameter portion to inner ring 3 that extends along the ring axis for a predetermined distance, at least equal to the thickness of O-ring 7. On that plateau, when the ring 3 is in its fully extended position, the O-ring is pressed between the annular flange 4 of inner ring 3 and annular lip 2 of outer ring 1.

The axial force produced by the O-ring couples through the inner ring to spring fingers 5 to press the distal front edge of the spring finger the tapered front edge of lip 2.

The spring fingers are stiff and do not easily bend. Due to the symmetrical arrangement of the spring fingers about the axis of inner ring 3, the force coupled through the inner ring is evenly distributed about the axis ensuring the positive contact of all spring fingers with lip 2. The pressure on the fingers allows ring 3 to maintain a straight position, and the ring 3 is restrained from swaying relative to ring 1. Further because the two sections are latched in this position with the O-ring between the two rims, inner ring 3 cannot move axially in position, thereby maintaining a rigid joint.

By design the length of spring fingers 5 is such that the distal end of the finger is positioned within the inwardly tapered front edge of lip 2 when the inner ring 1 is fully extended. The distal end of the spring fingers are also spaced from the rear flange 4 by a distance approximately equal to the thickness of the O-ring and the axial thickness of the portion of lip 2 outside the tapered portion, so that when the distal end of the spring fingers are pressing against the tapered front edge 2 of outer ring 1, the O-ring is simultaneously placed in compression between flange 4 and lip 2 by the axial force produced by the spring fingers 5, which maintain that compression. The spacing distance may best be determined through trial and error. Preferably, in this circumstance the O-ring may bulge outwardly against the inner cylindrical wall of outer ring 1 to remove any slack and ensure a firm joint. This produces a joint that cannot vibrate axially, as could occur with a loose fit at the joint juncture, and cannot wobble, since the O-ring takes up any lateral slack between the concentric rings at that joint juncture.

The telescoping tubes are combined with any conventional mechanism that moves the tubes axially to extend the telescope. Those devices may be of the type that either pushes the smaller diameter tubes out of the larger ones from the rear or may be one like a robotic arm that manually grips the smaller diameter tube and pulls that tube, and the others, out in sequence to the extended position.

The foregoing joint structure contains two rings. It is appreciated that a telescoping tube device may contain a greater number of tube sections than the two tubes illustrated; and that like structures are formed with tubes and rings whose diameters progressively decrease in size. The geometry of the joint and O-ring for those sections is accordingly smaller in size to fit. Irrespective of the number of sections, to extend the telescope, one of the tubes is pushed or pulled out along the axis of the assembly of FIG. 1 and the action of the elements in FIG. 1 is representative of the operation of all of the joints.

It is appreciated that once extended in space vehicle operation, the telescoping tubes remain extended throughout the life of the vehicle. Accordingly, the joints cannot be easily unlatched. However, for Earth based testing, it is seen that the spring fingers may be compressed by applying a ring compressor to the outer surface, similar to the ring compressors used for installing automobile engine rings, and squeezing the rings down to beneath the edge of lip 2. Then the inner tube may be axially pushed back into the interior of outer tube 1 after which the entire telescoping tube assembly should be disassembled.

Upon withdrawing the tubes from the assembled relationship the spring fingers are again compressed and, while compressed, the O-ring is repositioned over the spring fingers and into its temporary seat there over. The spring compressor is then removed. The telescoping tube assembly may then be reassembled to the standby condition by inserting each tube through the other in serial order.

In the foregoing embodiment the O-ring serves as an expandable band and as a gasket. As those skilled in the art appreciate other equivalent expandable bands may be substituted in less preferred embodiments. As example, an expandable band may be formed of spring metal. More specifically, a band may be formed into a loop with the ends of the band facing one another and slightly spaced. The spring force of the loop configuration is sufficiently strong to restrain the spring fingers. However, when one tube is pulled out of the other, the pulling force is sufficient to overcome that spring force and expand the band. Additionally, in such an embodiment, compressible gasket material may be attached to the surface of flange 4. That gasket material would be of a thickness that is greater than the width of the band. Still other equivalent structures may be substituted.

It is believed that the foregoing description of the preferred embodiment of the invention is sufficient in detail to enable one skilled in the art to make and use the invention. However, it is expressly understood that the detail of the elements presented for the foregoing purpose is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. A joint for a telesoping tube assembly comprising:

first and second hollow cylindrical members having front and rear ends;

said front end of said first hollow cylindrical member including a lip, said lip radially inwardly extending from said front end to define a front end opening of a first diameter;

said rear end of said second hollow cylindrical member including a flange, said flange being radially outwardly extending to define a peripheral edge of a second diameter;

spring finger means carried by said second cylindrical member;

said second hollow cylindrical member and said spring finger means being oriented coaxial of said first hollow cylindrical member and being at least partially received within said first hollow cylindrical member and extending through said front end of said first hollow member, and said second cylindrical member being axially movable a limited extent relative to said first cylindrical member to define a telescoping relationship;

said spring finger means being of a predetermined length oriented along the length direction of said second cylindrical member and having proximal and distal ends with said proximal end being connected to said second hollow cylindrical member and said distal end being free, said spring finger means being mechanically biased to flare said distal end radially outwardly of said second hollow cylindrical member;

an O-ring;

said O-ring having an inner diameter, outer diameter, a predetermined thickness and a predetermined elasticity;

said O-ring being positioned over said spring finger means, coaxial with said second hollow cylindrical member and internal of said first hollow cylindrical member for restraining said spring finger means from flaring radially outwardly;

said O-ring being slidable axially along said second cylindrical member relative to said spring finger means;

said first diameter defined by said lip being smaller than said outer diameter of said O-ring;

said second diameter defined by said peripheral edge of said flange being greater than said inner diameter of said O-ring and greater than said first diameter defined by said lip, whereby said lip is adapted to block axial movement of said O-ring when said second hollow cylindrical member is axially moved a predetermined extent out said front end of said first hollow cylindrical member;

said distal end of said spring finger means being axially spaced from said flange by a predetermined spacing distance; and wherein said spring finger means is withdrawn from a position underlying said O-ring and, released from restraint imposed by said O-ring, radially outwardly expands against said lip to latch said joint in extended position when said spring finger means is axially carried by said second cylindrical member out said front end by a second predetermined extent of axial movement.

2. The invention as defined in claim 1, wherein said flange is adapted to engage said O-ring when said second hollow cylindrical member is axially moved out said front end of said first hollow cylindrical member said second predetermined extent to squeeze said O-ring against said lip.

3. The invention as defined in claim 2, wherein said lip comprises an inwardly conically tapered front edge surface to define a maximum lip thickness at a radially outward edge and a minimum lip thickness at a radially inward edge thereof; wherein said spring finger means engage said lip at said tapered front edge, when said spring finger means radially outwardly expand; and wherein said predetermined spacing distance between said distal end of said spring finger means and said flange is at least equal to the sum of said thickness of said O-ring and said minimum lip thickness.

4. The invention as defined in claim 3, wherein said O-ring, in response to being squeezed, produces an axially directed restoring force; wherein said spring finger means engage said lip at said tapered front edge, when said spring finger means radially outwardly expand; and wherein said axially directed restoring force couples through said flange and second cylindrical member to said spring finger means and presses said spring finger means against said tapered front edge of said lip.

5. The invention as defined in claim 4, wherein said second hollow cylindrical member includes an outer surface portion, said outer surface portion including:
an enlarged diameter portion of predetermined axial length equal to the thickness of said O-ring, said enlarged diameter portion bordering a side of said flange; and
a tapered portion, said tapered portion extending axially a predetermined axial distance between said enlarged diameter portion and said outer surface portion of said second hollow cylindrical member to define a ramp for gradually expanding said O-ring to permit said O-ring to seat on said enlarged diameter portion when said second hollow cylindrical member moves axially to said predetermined extent out said front end of said first hollow cylindrical member while said O-ring is being blocked by said lip.

6. The invention as defined in claim 3, wherein said second hollow cylindrical member includes an outer surface portion, said outer surface portion including:
an enlarged diameter portion of predetermined axial length equal to the thickness of said O-ring, said enlarged diameter portion bordering a side of said flange; and
a tapered portion, said tapered portion extending axially a predetermined axial distance between said enlarged diameter portion and said outer surface portion of said second hollow cylindrical member to define a ramp for gradually expanding said O-ring to permit said O-ring to seat on said enlarged diameter portion when said second hollow cylindrical member moves axially to said predetermined extent out said front end of said first hollow cylindrical member while said O-ring is being blocked by said lip.

7. The invention as defined in claim 2, wherein said O-ring, in response to being squeezed between said flange and said lip, produces an axially directed restoring force; and wherein said axially directed restoring force couples through said flange and second cylindrical member to said spring finger means and presses said spring finger means against said lip.

8. The invention as defined in claim 1, wherein said second hollow cylindrical member includes an outer surface portion, said outer surface portion including:
an enlarged diameter portion of predetermined axial length equal to the thickness of said O-ring, said enlarged diameter portion bordering a side of said flange; and
a tapered portion, said tapered portion extending axially a predetermined axial distance between said enlarged diameter portion and said outer surface portion of said second hollow cylindrical member to define a ramp for gradually expanding said O-ring to permit said O-ring to seat on said enlarged diameter portion when said second hollow cylindrical member moves axially to said predetermined extent out said front end of said first hollow cylindrical member while said O-ring is being blocked by said lip.

9. In a latching telescoping tube apparatus, including a first joint member and second joint member, with said second joint member being at least partially received within said first joint member and movable outwardly therefrom to an extended position, the improvement comprising:
spring fingers carried by said second joint member, said spring fingers being radially outwardly expandable to latch said second joint member in position in said extended position relative to said first joint member; and
restraining means for preventing radially outward expansion of said spring fingers until said second joint member moves toward said extended position.

10. The invention as defined in claim 9, wherein said restraining means further includes means for maintaining pressure on said spring fingers when said second joint member is in said extended position.

11. The invention as defined in claim 9, wherein said restraining means comprises an expandable band.

12. The invention as defined in claim 11, wherein said expandable band comprises an O-ring.

13. A latching joint for a telescoping tube assembly containing multiple linked tubes of different diameters that fit one within another to form a relatively foreshortened arm or package for storage and are withdrawn from such short arm when deployed to form a long arm of tubes serially linked together, comprising:
a first tube having a hollow interior, an outer diameter and an inner diameter;
said first tube having a front end including a radially inwardly extending lip; said radially inwardly extending lip defining a circular front end opening to said first tube of a predetermined diameter, said predetermined diameter of said circular front end opening being smaller than said inner diameter of said first tube and smaller than said outer diameter of said first tube; said radially inwardly extending lip having a conically tapered front edge surface, tapering toward said interior of said first tube;
a second tube having a hollow interior, an outer diameter and being oriented concentric with said first tube, said outer diameter of said second tube being less than said predetermined diameter of said circular end opening, wherein said second tube fits concentrically within and at least partially extends through said front end of said first tube;
said second tube having a rear end section; said rear end of said second tube including a radially outwardly extending flange; said radially outwardly extending flange having an outer flange diameter said outer flange diameter being greater than said outer diameter of said second tube, greater than said diameter of said front end opening of said first tube, and smaller than said inner diameter of said first tube;

a spring metal sleeve containing a plurality of spring fingers integrally formed in and extending from an end of said metal sleeve; said metal sleeve being positioned coaxially of and attached to the outer surface of said second tube, whereby said second tube carries said metal sleeve and said spring fingers when said second tube axially moves;

said spring fingers being spaced about the periphery of said second tube and axially extend from said metal sleeve toward said rear end of said second tube in an axially extending direction to a predetermined axial position on said second tube spaced from said rear end of said second tube; said fingers having a free end biased to move radially outwardly of said second tube;

said free end of said spring fingers defining a circle of a predetermined diameter when said spring fingers are unrestrained, said predetermined diameter defined by said free end of said spring fingers being greater than said diameter of said front end opening of said first tube and smaller than said outer diameter of said first tube;

said spring fingers being of a predetermined thickness wherein the sum of twice said predetermined thickness of said spring fingers and said outer diameter of said second tube is no greater than said inner diameter of said lip of said first tube, whereby said spring fingers may be carried by said second tube through said front end opening;

O-ring means, said O-ring means having a predetermined outer diameter, a predetermined inner diameter and a predetermined thickness and being formed of an elastomeric material; said predetermined outer diameter of said O-ring being no greater than said inner diameter of said first tube and said inner diameter of said O-ring being at least as great as the sum of the outer diameter of said second tube and twice said thickness of said spring fingers, whereby said O-ring means fits over said spring fingers;

said O-ring means being positioned coaxially on said second tube and within said interior of said first tube in an initial axial position overlying said spring fingers for initially cocking and holding said free end of said fingers down against the outer surface of said second tube, whereby with said first and second tubes being relatively axially positioned in a first position relative to each other, said spring fingers are biased to produce a radially outwardly directed force against said O-ring means;

said O-ring means being axially moveable relative to said second cylindrical tube axially away from said initial position to a second axial position off of said spring fingers and against said flange, wherein said spring fingers are permitted to spring radially outwardly of said second tube;

wherein, during axial movement of said second tube out of said interior of said first tube a first predetermined axial extent, said lip of said first tube abuts said O-ring means to prevent said O-ring means from being carried by said second tube further in axial movement and, during continued axial movement of said second tube to a second predetermined extent, said spring fingers carried by said second tube are withdrawn from a position underlying said O-ring means and flare radially outwardly into contact with said rim, and then, upon further axial movement of said second tube to a third predetermined extent, further radially outwardly flare to abut said spring finger's free ends against said conically tapered front edge of said lip to latch said first and second tubes in said relative axial position;

said flange engaging said O-ring means to press said O-ring means between said flange of said second tube and said lip of said first tube for limiting the extent of axial movement of said second tube out of said first tube to said third predetermined extent, said O-ring means compressing and radially outwardly expanding responsive to a compressive force to engage an inner wall of said first tube; and wherein said outer surface of said second tube includes an enlarged diameter portion located adjacent said flange for seating said O-ring means when said tubes have relatively axially moved said third predetermined extent, said enlarged diameter portion being of an axial length equal to said thickness of said O-ring means; and wherein said outer surface of said second tube further includes a conically tapered portion adjacent said enlarged diameter portion to define a ramp for guiding said O-ring means onto said enlarged diameter portion.

* * * * *